(No Model.)

T. L. REGESTER.
AUTOMATIC WATERING TROUGH.

No. 525,772. Patented Sept. 11, 1894.

Witnesses
Cele Burdue
Horace A. Dodge.

Inventor
Thomas Lyb Regester
by John G. Manahan
his Attorney

UNITED STATES PATENT OFFICE.

THOMAS LYLE REGESTER, OF STERLING, ILLINOIS, ASSIGNOR TO DENNY & STEVENS, OF SAME PLACE.

AUTOMATIC WATERING-TROUGH.

SPECIFICATION forming part of Letters Patent No. 525,772, dated September 11, 1894.

Application filed August 3, 1893. Serial No. 482,302. (No model.)

*To all whom it may concern:*

Be it known that I, THOMAS LYLE REGESTER, a citizen of the United States, residing at Sterling, in the county of Whiteside and State of Illinois, have invented certain new and useful Improvements in Automatic Watering-Troughs; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has reference to automatically operating watering troughs, by which the amount of water permitted to enter said trough is regulated through the means of a valve operated by a float, supported upon the water in one portion of the trough. The rising of the water, by elevating the float, closes the valve for the ingress of water when the water in the trough has reached any desired altitude, and the depletion of the water in the trough, through the consequent lowering of the float, tends to open said ingress, and permit the inflow of the water until sufficient of the latter has accumulated in the trough to raise the float and again close the ingress valve, as aforesaid.

My invention is adapted to be attached to any water reservoir, barrel, or tank, and is particularly advantageous in watering hogs. I make the entire trough of cast iron, and therefore it is very durable in use, and can be afforded very cheaply, The main purpose in my invention is to provide a trough which shall be so small that the hogs will be unable to get therein so as to pollute the water, while at the same time, by means of the automatic communication with the main reservoir, or tank, a constant and sufficient supply of water will be present in the trough, as the same is needed.

I attain the foregoing advantages by the construction illustrated in the accompanying drawings, in which—

Figure 1:
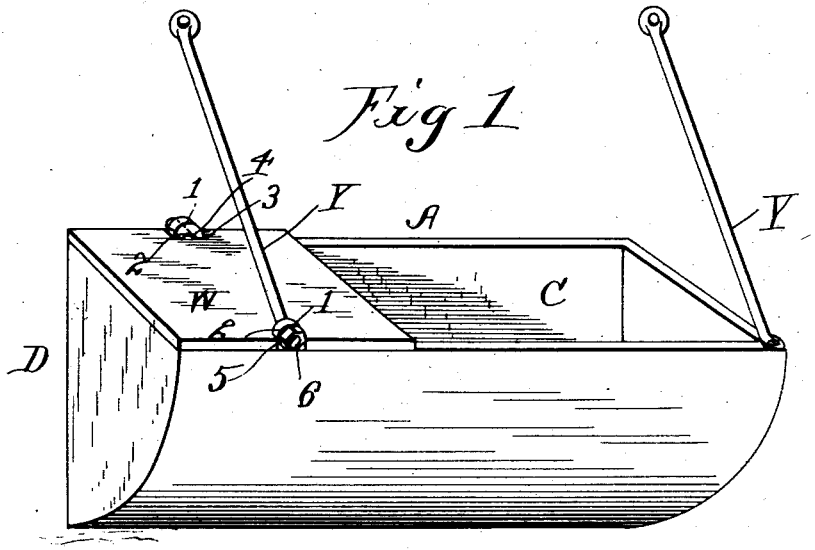
Figure 2:
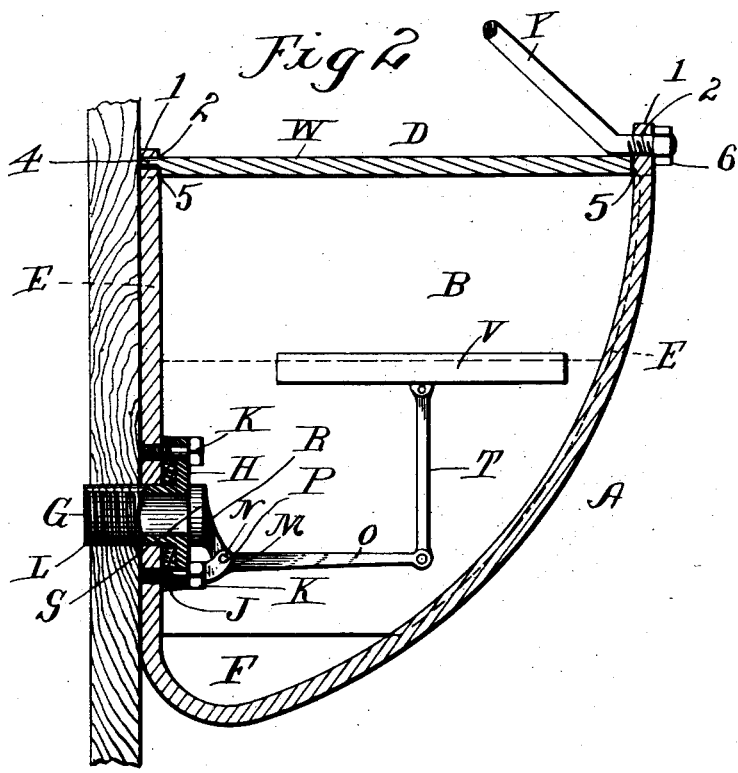

Figure 1 is a perspective of a trough provided with my improvement. Fig. 2 is a cross section of Fig. 1, showing the construction, location, and mode of operation of the several parts employed.

Similar letters and figures refer to similar parts throughout both views.

A is the general trough, constructed, as aforesaid, of cast iron, and properly painted or coated within and without. A removable partition B divides said trough, about centrally, into the watering chamber C and the valve chamber D. The partition B is removably seated in ways E—E, formed interiorly on the walls of the trough A; but do not extend entirely across the bottom of said trough, leaving a space, or interval, F under the partition B for the passage of the water from chamber D into chamber C. In the back of the trough A, and near the lower end of the valve chamber D, there is seated horizontally in the wall of said trough a short hollow cylinder G, provided at its inner end with an annular external flange, or head, H. The head H is placed against the inner wall of the adjacent side of the trough A, having interposed between it and said wall a leather or other flexible gasket J, to effectually seal the opening in said wall through which said cylinder G is inserted. Transverse bolts K—K, suitably distributed around the head H, and inserted through the same and the wall of the trough A, serve to hold said gasket and the cylinder G in position, and at the same time seal the walls of said opening against the escape of water, except through said cylinder. The main portion of the cylinder G projects outside the trough A, and is provided on its exterior with screw threads L. The trough A is rigidly attached to any barrel, hogshead or other reservoir, by simply boring a hole in the wall of such reservoir, slightly smaller than the diameter of the cylinder G, and said cylinder, being rigidly seated in the wall of the trough A, the latter can be attached to such reservoir by simply inserting the cylinder G in the said hole in the reservoir, and turning the trough A around, like the head of an auger, until the said trough is screwed up tightly against such reservoir. Below the inner opening of the cylinder G there are cast on said head H, integral therewith, upwardly extending lugs M—M, provided, respectively, with transverse openings N. A float lever O is pivotally seated at its inner end between the ears M by means of the transverse bolts P, passed through the openings N in said ears, and through the adjacent end of the lever O. On such pivoted end of lever O there is formed the upwardly extended projection R, upon the outer face of which is placed the valve S, opposite to and adapted to close the inner end of the cylinder G whenever the long end of the float lever O is elevated, and to open said opening, and permit the inflow of the water through the same whenever the long end of said lever is depressed.

The lever O is extended substantially horizontal from its pivotal seat into the valve chamber D near the bottom of the latter, and is there connected by a toggle T to the hollow metallic float V, adapted to be supported by and to rise with the varying altitude of the water in the trough B, and, through the medium of the lever O, close the inner end of the cylinder G. When the water in trough A subsides, the float V descends and the weight of the long end of lever O opens the valve S and permits the inflow of water through cylinder G.

A lid W is adapted to close the top of the valve chamber D by the following provision:— Ears 1—1 are formed oppositely on the upper edge of the front and back walls of said chamber D, and provided with openings 2—2. A recess 3 is formed on one side of the lid W of the same width as one of said ears, and centrally in said recess there is formed on said lid a pintle 4, adapted to enter the opening 2 in said ear. On the opposite side of the lid W there is formed a corresponding recess 5, adapted to receive the opposite ear 1. The lid W is placed in position by inserting the pintle 4 in one of the openings 2, and dropping the recess 5 over the opposite ear 1, and inserting in the latter ear the lower end of brace Y, provided with an end nut 6. The recesses 3 and 5 prevent the lateral movement of the lid W and the pintle 4 and cotter 6 prevent its upward movement, and said lid is thereby removably held in position.

A brace Y, is attached, at its lower end to outside of trough A, and extended upward over said trough, and fastened at its opposite end to the reservoir.

What I claim as my invention, and desire to secure by Letters Patent of the United States, is—

In an automatic watering trough, the combination, with a trough having a partition intermediate of its ends extending nearly to the bottom thereof, and also having a perforated ear upon the upper edge of the front and back walls opposite to each other, a cover for the ends of the trough provided with the ears, said cover having a notch or recess in its front and rear edges to fit over said ears, the rear recess having a pintle projecting thereinto to engage with the opening in the rear ear, a brace extending from above the top of the trough down to the front wall of the trough and projecting through the front ear above the cover, whereby the brace supports the trough and prevents the removal of the cover, and an automatic valve within the covered end of the trough for regulating the flow of water into the trough, substantially as set forth.

In testimony whereof I affix my signature in presence of two witnesses.

THOMAS LYLE REGESTER.

Witnesses:
JOHN G. MANAHAN,
VIRGIL S. FERGUSON.